United States Patent
Klein et al.

[15] 3,651,618
[45] Mar. 28, 1972

[54] SEPARATION OF FLUIDS BY DIFFUSION THROUGH SEMIPERMEABLE MEMBRANES

[72] Inventors: Gunter Klein, Neuried; Johann Neumann, Oberhausen, both of Germany

[73] Assignees: Linde Aktiengesellschaft, Wiesbaden; Kempchen & Co. GmbH, Oberhausen, Germany

[22] Filed: May 20, 1970

[21] Appl. No.: 39,124

[30] Foreign Application Priority Data

May 20, 1969  Germany.....................P 19 25 582.4

[52] U.S. Cl.................................................55/16, 55/158
[51] Int. Cl.......................................................B01d 59/12
[58] Field of Search..........................55/16, 58; 210/23, 321

[56] References Cited

UNITED STATES PATENTS

| | | | |
|---|---|---|---|
| 3,429,105 | 2/1969 | Llewellyn et al. | 55/158 |
| 3,335,545 | 8/1967 | Robb et al. | 55/158 |
| 3,396,510 | 8/1968 | Ward et al. | 55/16 |
| 3,246,449 | 4/1966 | Stern et al. | 55/16 |
| 3,430,417 | 3/1969 | Cree | 55/16 |
| 3,405,058 | 10/1968 | Miller | 210/23 |

*Primary Examiner*—Charles N. Hart
*Attorney*—Millen, Raptes & White

[57] ABSTRACT

In a process comprising diffusing a fluid through the upstream side of a semipermeable membrane having upstream and downstream sides, to the downstream side, the improvement comprising exposing the downstream side during said diffusing to either a liquid which does not wet the downstream side, or to the vapor of said liquid, whereby the rate of diffusion of said fluid through said membrane is increased and wherein said semipermeable membrane is a microporous sintered material, e.g., polytetrafluoroethylene having a pore diameter of 1–1,000, preferably 5–200 microns.

20 Claims, 4 Drawing Figures

SEPARATION OF FLUIDS BY DIFFUSION THROUGH SEMIPERMEABLE MEMBRANES

BACKGROUND OF THE INVENTION

This invention relates to the separation of mixtures by diffusion through a thin membrane, and in particular to a technique for increasing rates of diffusion.

It is known that hydrogen diffuses at an extraordinary speed through thin, hot palladium sheets, this effect having been utilized for a long time for separating hydrogen from hydrogen-containing gaseous mixtures. Numerous attempts have been made to obtain similar diffusion effects for the separation of other gases with the aid of other semipermeable materials. Thus, it is conventional, for example, from German published application Pat. No. 1,269,096 [DAS] to employ a thin silicone rubber film as the semipermeable membrane in order to separate xenon and krypton from a mixture containing nitrogen.

Generally speaking, however, membrane gas separation has been uneconomic for the industrial scale separation of mixtures, especially of normally gaseous common components, because, although the membranes exhibit a measurable separating effect, they have diffusion coefficients (diffusivities) which, on the average, are too small by several orders of magnitude in order to be competitive with other separation processes.

SUMMARY OF THE INVENTION

An object of one aspect of the present invention is to provide improvements in membrane separation, and especially to provide a system amenable to large scale utilization on an economic basis.

Upon further study of the specification and appended claims, other objects and advantages of the present invention will become apparent.

These objects are attained by employing a membrane made of a sintered lyophobic synthetic polymer and exposing this membrane on the downstream side to a liquid or the vapor thereof which does not wet the synthetic material.

DETAILED DISCUSSION OF THE INVENTION

This invention is based on the discovery that the diffusion of gases or liquids takes place extraordinarily rapidly through membranes produced by sintering lyophobic synthetic materials, as soon as one side of the membrane is exposed either to a liquid or the vapor thereof which does not wet the synthetic material. In this process, the diffusion occurs from the side of the membrane unexposed to the non-wetting liquid or the vapor thereof towards the exposed side. The permeability of these membranes unexpectedly ranges above the permeabilities of conventional membranes by several powers of ten.

The diffusion of matter can also be significantly increased by varying the temperature. The larger the temperature difference between the unexposed and the exposed sides of the membrane -- with the higher temperature being on the exposed side -- the greater is the rate of diffusion. (Additionally, the rate of diffusion is also directly proportional to the absolute temperature.)

Another important feature of the membrane of this invention is that a pressure gradient across the membrane is unnecessary to initiate diffusion. In this respect, the separation system of this invention differs from conventional systems since in the latter a pressure gradient across the membrane is employed as the driving force for diffusion. Not only is such a driving force unnecessary in the present invention, but it is also possible, for example, for an excess pressure to be built up on the side of the downstream side of the membrane, i.e., that side exposed to the liquid or the vapor thereof. (On the other hand, the rate of diffusion through the lyophobic membranes of this invention can be increased by providing a positive driving force, i.e., by increasing the pressure on the upstream side of the membrane as compared to the downstream.)

With respect to the particulars of the membrane itself, another essential requirement, in addition to being lyophobic, is that the membrane of this invention must exhibit a microporous structure; for only in the presence of extremely fine pores through the membrane does this rate of diffusion increase upon exposing the membrane to a liquid or the vapor thereof, which does not wet the membrane. Generally, the diameter of these pores is about 1 to 1,000, preferably 5 to 200 microns.

A measure for the degree of the lyophobicity is the wetting angle of a liquid on a surface. The wetting angle of water on an inventive membrane of pure polytetrafluoroethylene having a smooth surface should be greater than 90°, preferably between 100° and 130°.

The most preferred membrane for the purposes of the invention consists of pure polytetrafluoroethylene, but there are also other membranes which can be used, e.g., mixtures of polytetrafluoroethylene with polyethylene, polypropylene, polyvinylchloride, metal powder (e.g., copper), carbon in the form of carbon black or graphite, and asbestos powder. The percentage of the additives should not exceed 50 percent by volume, preferably 30 percent by volume, of the whole mass. In other words, the membrane comprises at least 50 percent, preferably at least 70 percent by volume of polytetrafluoroethylenes.

As an example of a membrane-liquid pair according to this invention, a preferred specie is hydrophobic plastic membrane exposed on one side to water or steam. Thorough investigations have shown that water or steam is indispensable for effecting the desired rates of diffusion through hydrophobic membranes. Thus, when the membrane is not so exposed, or when the hydrophobic property is eliminated, for example, by treatment with a wetting agent, the rate of diffusion is reduced to almost zero.

Not only is the rate of diffusion increased with a system of hydrophobic membranes and water, but also it has been with other membrane-liquid pairs, as soon as the condition of not being wettable by the liquid employed is met. This is the case, for example, in all sintered plastic films and mercury, or molten alkali metal mixtures, preferably eutectic ones.

Simultaneously with the extraordinarily increased rate of diffusion of various substances through the membrane of this invention, a separation of matter likewise takes place when employing mixtures of substances, for example, gaseous mixtures. This separation of matter results from the different diffusivities of the individual components of the mixture. For industrial purposes, several membranes can be arranged in series in order to obtain the desired separating effect.

There are several known methods for producing the lyophobic membrane of this invention. For the purposes of illustration, a membrane satisfying the requirements of this invention can be produced as follows:

Polytetrafluoroethylene powder is thoroughly mixed with an aqueous emulsion of silicone resin, for example a 25 percent aqueous emulsion, until a pasty consistency is obtained, optionally with the introduction of distilled water. Thereafter, the mass is kneaded with frequent folding and rolled with concomitant shaping. The amount of the silicone resin admixed thereto is about 5–20 percent by weight in the finished dry product. Rolling is effected, for example, by the cold rolling method, wherein the prekneaded mass to be shaped is rolled in one or several passes, and the rolled product is thereafter dried in air, in drying furnaces, in continuous-heating furnaces, or also on drying rolls. It is especially advantageous to conduct the rolling step with adjustable tension on the material to be rolled and to be reeled up, whereby special advantages are obtained with respect to the elastic behavior of the thus-manufactured film. The production of such a membrane is described e.g. in German Pat. No. 1,212,725.

It is also possible to work the polytetrafluoroethylene powder into a paste with oil in place of the aqueous silicone resin emulsion, and to hot roll it, after which the oil is extracted with a solvent, for example, benzene.

It has also proved to be advantageous for the process of this invention to impart a roughened structural surface to the membranes, be it by subsequent hot forming, or be it by the insertion of rolls having a correspondingly shaped surface in the last rolling process. Membranes prepared in this manner exhibit higher diffusivities than membranes having a smooth surface.

The most simple member of preparing a roughened structural surface on the membranes consists in covering the surface of the roll in the last rolling step e.g. with a wire net or with a piece of cloth.

The process of this invention makes it possible not only to separate, for example, hydrogen from other gases, such as nitrogen or carbon monoxide, but also to separate gaseous hydrocarbon mixtures and to free saline solutions from their salt content; accordingly, the process of this invention can also be employed for seawater desalination.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

This example relates to the measurement of diffusion rates of a number of gases through a water-covered polytetrafluoroethylene membrane. The experimental apparatus consisted of a large vessel with a gas inlet, within which vessel there was disposed a substantially tubular polytetrafluoroethylene membrane having a significantly smaller diameter. The tubular membrane was closed at the top and at the bottom, and by way of the upper cover lid, it was connected to a manometer, or with a gas meter. The membrane was filled interiorly with water which could be heated. Furthermore, temperature measuring points were provided which made it possible to measure the temperature of the water and the temperature of the gas in the substantially larger vessel. The membrane had a thickness of about 0.15 mm.

The results of the measurements are submitted in Table 1. In this connection, $T_B$ = water temperature = temperature of the gas after the diffusion; $T_A$ = gas temperature before diffusion, $\Delta P$ = excess pressure on the downstream side after the diffusion in case no gas is withdrawn.

TABLE 1

| Experiment | Gas | $T_B$ °C | $T_A$ °C | $\Delta P$ mm. water | Rate of diffusion Nm.³/m.²·h | Permeability Ncm.³·cm./cm.²·sec. $\Delta$cm. Hg |
|---|---|---|---|---|---|---|
| 1 | $H_2$ | 60 | 35 | 112 | 0.82 | $32 \cdot 10^{-6}$ |
| 2 | He | 60 | 36 | 113 | 0.61 | $24 \cdot 10^{-6}$ |
| 3 | | 83 | 39 | 900 | 3.47 | $41 \cdot 10^{-6}$ |
| 4 | Ne | 58 | 34 | 60 | 0.14 | $6.1 \cdot 10^{-6}$ |
| 5 | Ar | 60 | 24 | 51 | 0.13 | $4.3 \cdot 10^{-6}$ |
| 6 | | 73 | 35 | 102 | 0.27 | $5 \cdot 10^{-6}$ |
| 7 | | 86 | 40 | 348 | 0.68 | $7.3 \cdot 10^{-6}$ |
| 8 | $N_2$ | 60 | 28 | 53 | 0.15 | $5.15 \cdot 10^{-6}$ |
| 9 | | 82 | 35 | 342 | 0.98 | $1.2 \cdot 10^{-6}$ |
| 10 | CO | 60 | 29 | 48 | 0.08 | $2.8 \cdot 10^{-6}$ |
| 11 | | 87 | 42 | 348 | 0.59 | $6 \cdot 10^{-6}$ |
| 12 | $CO_2$ | 60 | 27 | 25 | 0.038 | $1.3 \cdot 10^{-6}$ |
| 13 | | 82 | 33 | 226 | 0.68 | $8.1 \cdot 10^{-6}$ |
| 14 | $CH_4$ | 60 | 30 | 44 | 0.09 | $3.2 \cdot 10^{-6}$ |
| 15 | | 83 | 35 | 264 | 0.73 | $8.4 \cdot 10^{-6}$ |
| 16 | $C_2H_6$ | 60 | 30 | 29 | 0.058 | $2.1 \cdot 10^{-6}$ |
| 17 | | 84 | 36 | 197 | 0.51 | $5.7 \cdot 10^{-6}$ |
| 18 | $C_2H_4$ | 60 | 34 | 32 | 0.071 | $2.7 \cdot 10^{-6}$ |
| 19 | | 86 | 39 | 268 | 0.52 | $5.4 \cdot 10^{-6}$ |
| 20 | $C_3H_8$ | 60 | 30 | 17 | 0.026 | $0.93 \cdot 10^{-6}$ |
| 21 | | 85 | 36 | 190 | 0.29 | $3.1 \cdot 10^{-6}$ |

It can be seen from the table that the gases, having a small atomic radius, such as hydrogen and helium, diffuse much more rapidly than larger atoms, such as those of neon or argon, for example. It can furthermore be seen that the rate of diffusion increases extraordinarily rapidly with a rising absolute temperature of the gas after the diffusion, as derived from the comparative measurements with argon at various temperatures. Finally, Table 1 also shows that an excess pressure is established within the tubular membrane with respect to the pressure in the external chamber, in case no gas is withdrawn from the external chamber. This excess pressure can, in part, assume quite considerable values, especially at a higher absolute temperature (in case of helium and at 83° C., for example, 900 mm. water).

EXAMPLE 2

With the same experimental apparatus, investigations were also conducted with various gases, but wherein, differently from Example 1, there is varied the type of material inside the tubular membrane, i.e., the substance exposed to the downstream side of the membrane. The membrane employed was again a polytetrafluoroethylene membrane having a thickness of 0.15 mm. The results are compiled in Table 2.

TABLE 2

| Experiment | Gas | $T_A$ °C | $T_B$ °C | $\Delta P$ mm. $H_2O$ Col. | Rate of diffusion Nm.³/m.²·h | Substance exposed to downstream side of membrane |
|---|---|---|---|---|---|---|
| 1 | $N_2$ | 19 | 47 | 7 | 0 | Acetone. |
| 2 | $N_2$ | 28 | 75 | 0 | 0 | Ethyl acetoacetate. |
| 3 | He | 26 | 76 | 14 | 0.049 | Al powder, dry. |
| 4 | He | 20 | 48 | 9 | 0 | Acetone. |
| 5 | He | 25 | 72 | 4 | 0 | Ethyl acetoacetate. |
| 6 | He | 30 | 78 | 29 | 0.033 | Trichloroethylene. |
| 7 | He | 28 | 81 | 6 | 0 | Engine oil 3.8° F. |
| 8 | He | 53 | 86 | 1100 | 2.8 | Water. |
| 9 | He | 22 | 63 | 298 | 0.58 | Water, water level=12 cm. |
| 10 | He | 22 | 63 | 332 | 0.58 | Water, water level=18 cm. |
| 11 | He | 22 | 63 | 196 | 0.58 | Water, water level=7 cm. |
| 12 | $N_2$ | 22 | 60 | 18 | 0.0068 | Water + 0.5% "Nekal."* |
| 13 | $N_2$ | 32 | 82 | 154 | 0.037 | Water + 0.5% "Nekal."* |
| 14 | $N_2$ | 22 | 62 | 29 | 0.03 | 60% by weight of $NaNO_3$ solution. |
| 15 | $CO_2$ | 23 | 60 | 84 | 0.023 | 1N HCl solution. |
| 16 | $N_2$ | 100 | 220 | | 0.1 | Mercury. |

*Trademark for a series of wetting and dispersing agents of General Aniline & Film Corp.

From Table 2, there can be seen the extraordinarily marked and surprising effect of the presence of pure water or steam on the rate of diffusion through a hydrophobic membrane. Conversely, when the membrane was wetted on the downstream side with anhydrous acetone or ethyl acetoacetate or engine oil, no diffusion of gas through the membrane was observed. It is also rather remarkable that the simple addition of "Nekal" or salts to the water effects a great reduction of the rate of diffusion.

Table 2 further shows that the level of the water in the tubular membrane, i.e., generally speaking the proportion of surface area wetted with liquid water, has substantially no effect, or at least has less effect than that brought about by the water vapor saturated atmosphere above the water surface. There is no other explanation for the identical rates of gas diffusion in Experiments 9, 10, and 11 of Table 2 at the different water levels of 12, 18, and 7 cm. Finally, it can be seen from Experiment 16 that the rate of diffusion when exposing the membrane to mercury is almost as satisfactory as that with water. In this instance, the permeability is $13 \cdot 10^{-6}$ Ncm³ · cm./cm.² · sec · $\Delta$cm. Hg.

EXAMPLE 3

Using the same experimental arrangement as employed in Examples 1 and 2, the rates of diffusion were measured with a water-covered polytetrafluoroethylene membrane of a thickness of 0.15 mm. In the following experiments, the data provided with the index A relate to the dry side of the membrane, and the data provided with the index B refer to the side of the membrane covered with water.

EXPERIMENT 1

Gas: $N_2$
$T_A = 28°$ C.  $T_B = 63.5°$ C.
$P_A$ about 1 atm. abs.  $P_B - P_A = 55$ mm. $H_2O$
Gas Diffusion (A to B)  $= 1.2$ Nm$^3$/m.$^2 \cdot$ h
Water Diffusion (B to A)  $= 10.6$ l./m.$^2 \cdot$ h

EXPERIMENT 2

Gas: $N_2$
$T_A = 45°$ C.  $T_B = 83°$ C.
$P_A$ about 1 atm. abs.  $P_B - P_A = 340$ mm. $H_2O$
Gas Diffusion (A to B)  $= 4.4$ Nm$^3$/m.$^2 \cdot$ h
Water Diffusion (B to A)  $= 18$ l./m.$^2 \cdot$ h

EXPERIMENT 3

Gas: He
$T_A = 38°$ C.  $T_B = 61°$ C.
$P_A$ about 1 atm. abs.  $P_B - P_A = 112$ mm. $H_2O$
Gas Diffusion (A to B)  $= 3.05$ Nm$^3$/m.$^2 \cdot$ h
Water Diffusion (B to A)  $= 8.7$ l./m.$^2 \cdot$ h

EXPERIMENT 4

Gas: He
$T_A = 51°$ C.  $T_B = 81°$ C.
$P_A$ about 1 atm. abs.  $P_B - P_A = 850$ mm. $H_2O$
Gas Diffusion (A to B)  $= 12.4$ Nm$^3$/m.$^2 \cdot$ h
Water Diffusion (B to A)  $= 19.8$ l./m.$^2 \cdot$ h The effectiveness of the lyophobic diffusion membrane of this invention will now be illustrated with reference to several graphs developed by experiments with the aid of a polytetrafluoroethylene membrane.

DETAILED DESCRIPTION OF THE DRAWINGS

Figure 1:
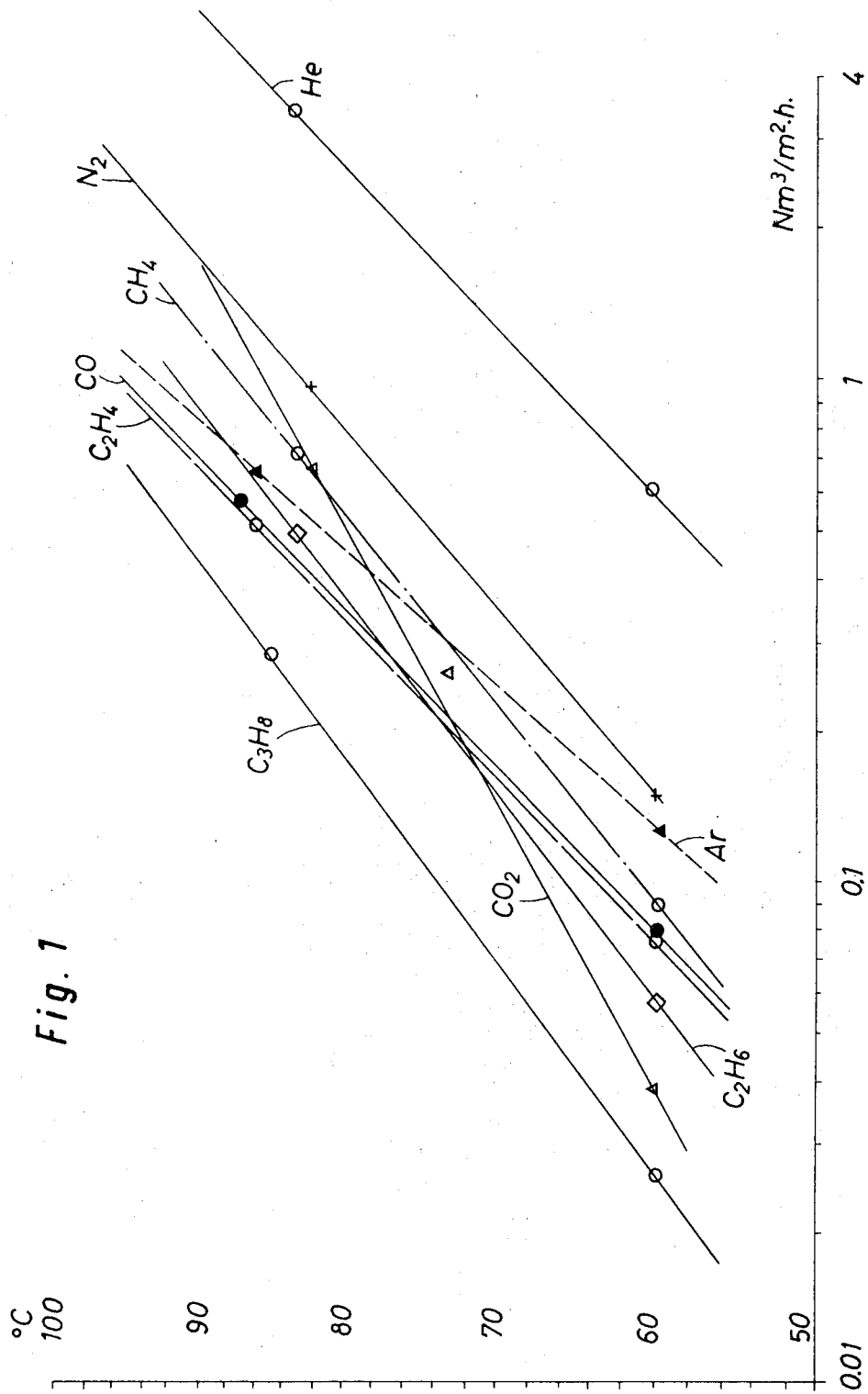
FIG. 1 is a graph wherein the rate of diffusion through the membrane is plotted as a function of temperature.

FIG. 1 shows the dependency of the rate of diffusion of various gases on the temperature of the water side of a polytetrafluoroethylene membrane having a thickness of 0.15 mm. The temperature of the water side is plotted on the ordinate and the amount of the respective gas which has diffused through the membrane is plotted on the abscissa in Nm.$^3$/m.$^2$ of membrane area · hour. The temperature difference between the water side of the membrane and the space adjoining the dry side of the membrane was about 30° C. in all experiments. It can be seen from the roughly parallel curves that low-boiling gases, such as hydrogen and helium, diffuse more rapidly, by about 1.5 powers of 10, than, for example, propane. Furthermore, it can be seen that a temperature increase of about 25° C. results in a rise in the rate of diffusion by about one power of 10.

Figure 2:
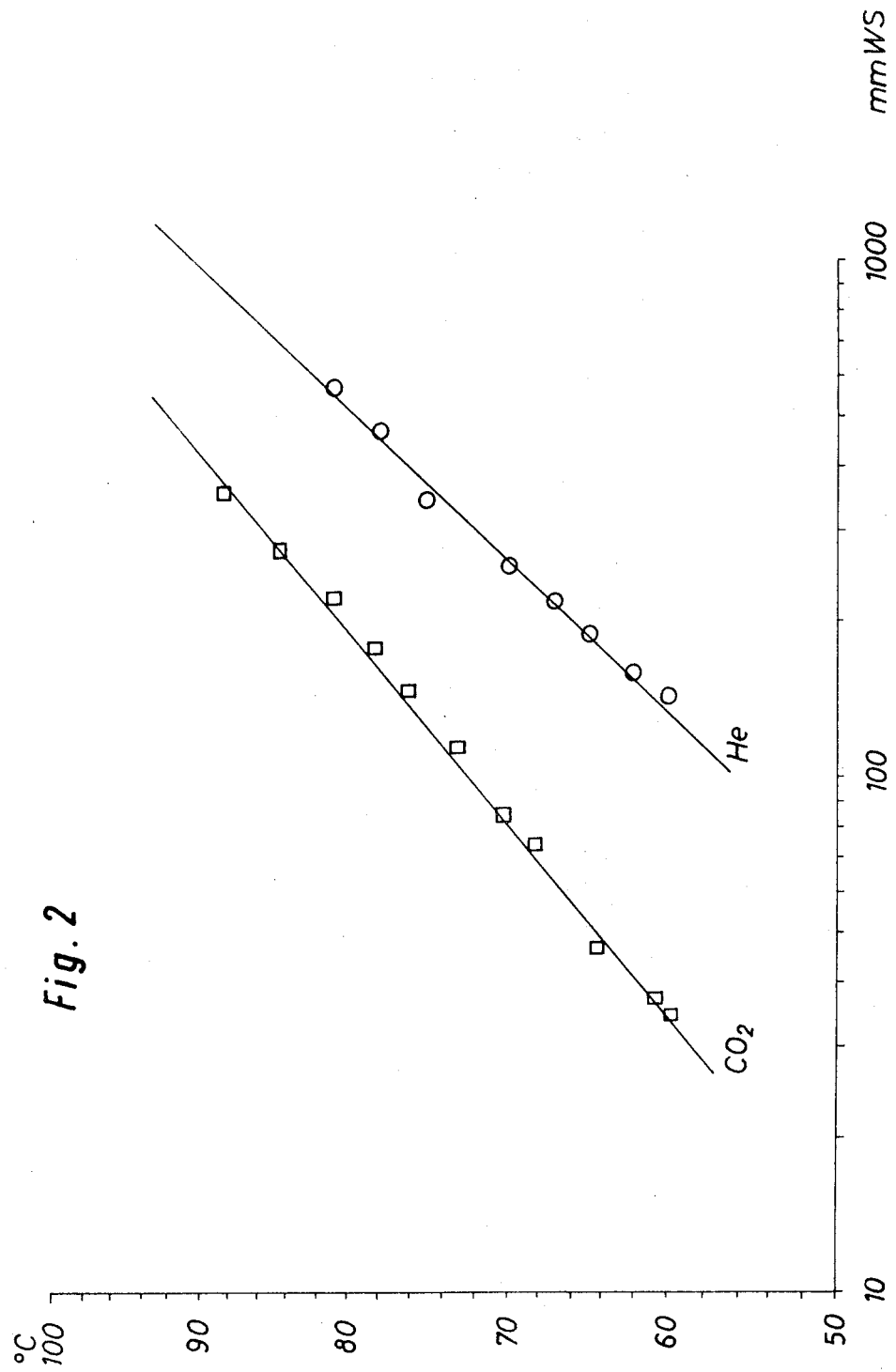
FIG. 2 is a graph wherein the excess pressure on the downstream side of the membrane is plotted as a function of temperature, the WS standing for column of water.

FIG. 2 shows a comparison of two gases, namely helium and carbon dioxide, with respect to the excess pressure produced during passage through a water exposed polytetrafluoroethylene membrane. As in FIG. 1, the temperature difference between the water side of the membrane and the dry side thereof was about 30° C., and the thickness of the membrane was 0.15 mm. The temperature of the water side of the membrane is again plotted on the ordinate, whereas the pressure obtainable with respect to the external space is plotted on the abscissa in mm. of water. It can be seen from the two curves that the rise in pressure with respect to the external space is larger, in case of the small helium atom, by about one-half the power of 10 than at the comparable temperature in case of the substantially larger carbon dioxide molecule.

On the basis of the substantially larger gas diffusion coefficient of hydrogen as compared to, for example, nitrogen (see Example 1 and FIG. 1), the process of this invention is especially advantageous for the separation of nitrogen from hydrogen, the latter preferentially passing through the membrane. Nitrogen-hydrogen mixtures are produced, for example, when processing coke oven gas or other hydrogen-rich gases by low temperature separation and subsequent scrubbing with liquid nitrogen. Even if the nitrogen scrubbing step is conducted at low pressures and accordingly low temperatures, it is impossible to obtain a nitrogen-free hydrogen at the head of the nitrogen scrubbing column. Rather, this hydrogen normally contains several percent of nitrogen. In order to obtain pure hydrogen, the nitrogen must be removed from the gaseous mixture; for this purpose, the process of the present invention is especially suitable.

Figure 3:
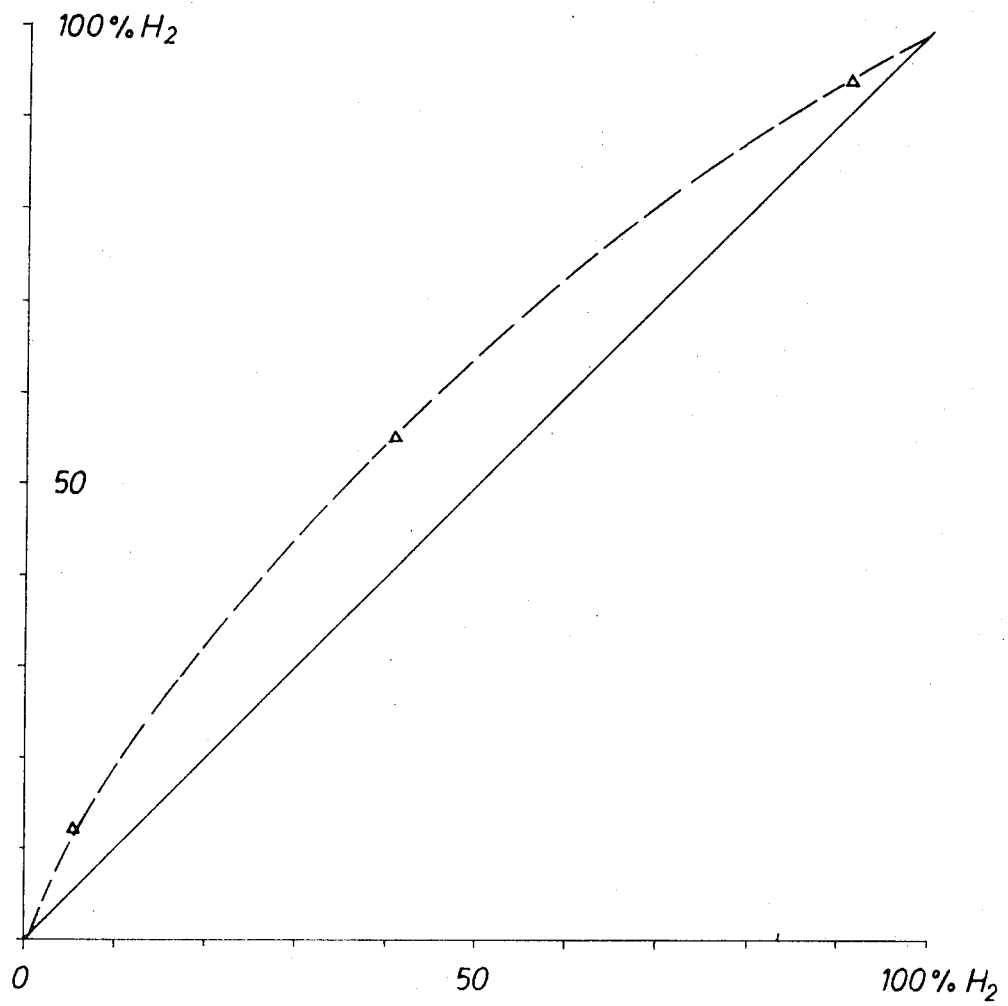
FIG. 3 is an equilibrium diagram for the separation of hydrogen from a mixture of hydrogen and nitrogen, using the technique of this invention.

For illustrative purposes, FIG. 3 shows the diffusion equilibrium between nitrogen and hydrogen on a water-covered polytetrafluoroethylene membrane having a thickness of 0.15 mm., at about 80° C. on the water-covered side of the membrane and a temperature difference of about 30° C. with respect to the dry side. The composition of the gas after diffusing through the membrane is plotted on the ordinate, and the composition of the gas prior to passage through the membrane is plotted on the abscissa. In the diagram, the curve in full lines relates to the mol percent composition of the gas prior to diffusing through the membrane, and the dashed-line curve is the composition of the gas after it has penetrated the membrane.

Figure 4:
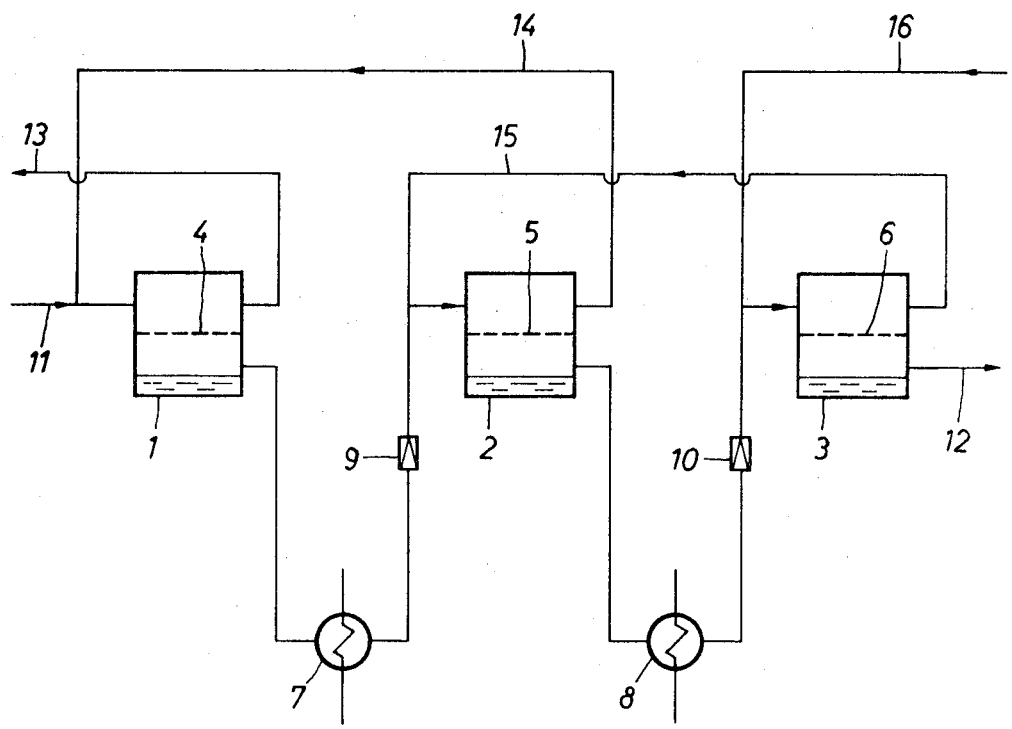
FIG. 4 is a schematic view of a preferred embodiment of this invention wherein several membrane stages are connected.

Referring now to FIG. 4, an arrangement is illustrated for the separation of gases by diffusion through hydrophobic plastic membranes exposed to water vapor. In this connection, 1, 2, and 3 are diffusion cells wherein the hydrophobic membranes 4, 5, and 6 are disposed, and which are charged with water in their lower portions. Between the diffusion cells, coolers 7 and 8 are provided, as well as expansion valves 9 and 10. The gas entering the upper part of the diffusion cell 1 at 11 at a temperature of about 50° C. diffuses, depending on the diffusion coefficients of the components thereof, from the top toward the bottom through the membrane 4 exposed from below to water vapor (steam). The temperature in the lower part of the diffusion cell is about 80° C. The diffused proportions of the gas then pass, together with the steam, into the cooler 7 where the steam is separated by condensation, and thereafter enter, at about 50° C., the upper part of the diffusion cell 2 via the expansion valve 9. After diffusion through the membrane 5, a separation of water is again conducted in cooler 8, whereupon the gas is expanded in valve 10 and is fed to the upper part of the diffusion cell 3. After passing through the membrane 6, the gas exits at 12.

Gas which has not diffused through the membrane 4 is removed from the diffusion cell 1 through conduit 13 leading to another diffusion cell which is not shown in the drawing and which is optionally arranged upstream thereof, whereas gas components which have not diffused through the membrane 5 are recycled through conduit 14 to the point upstream of the diffusion cell 1. A similar recycling arrangement is also provided between the diffusion cells 3 and 2 via conduit 15. Conduit 16 is a recycling line from a further diffusion cell which is optionally arranged downstream of the diffusion cell 3 but is not shown in the drawing.

Starting with a gas with 95% of $H_2$ and 5% of $N_2$, a hydrogen enrichment to 99% was obtained in an arrangement with four diffusion chambers similar to the above-described system. The membrane area required for this purpose was, per cell, 10 $m.^2/Nm^3 \cdot h$.

In another experiment, a gaseous mixture consisting of 62% of $H_2$, 34.5% of $CO_2$, 2.6% of CO, residual $CH_4$, other hydrocarbons, $H_2S$, and COS was converted into a mixture consisting of 99% of $H_2$ and 1% of $CO_2$; in this connection, about 12 diffusion cells were required equipped with 10 m.$^2$ of film per Nm.$^3 \cdot$ h. respectively.

The preceding example especially demonstrates the extraordinary advantages of this invention. Even if a final CO-content in the p.p.m. range is required of the gas, the process of this invention is completely sufficient for a separation of the gaseous mixture and can replace a copper solution scrubbing step with subsequent low temperature separation.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process comprising diffusing a fluid through the upstream side of a semi-permeable membrane having upstream and downstream sides, to the downstream side, the improvement comprising exposing the downstream side during said diffusing to either a liquid which does not wet the downstream side, or to the vapor of said liquid, whereby the rate of diffusion of said fluid through said membrane is increased, and wherein said semi-permeable membrane is a microporous solid sintered synthetic material.

2. A process as defined by claim 1 wherein said fluid is a mixture of components having different diffusivities, whereby said fluid is enriched in at least one of said components.

3. A process according to claim 1 wherein the membrane is a lyophobic organic polymer.

4. A process according to claim 1 wherein the membrane is a sintered hydrophobic synthetic material and is exposed on the downstream side to liquid water or saturated steam.

5. A process according to claim 1 wherein said fluid is normally gaseous.

6. A process according to claim 1, further comprising maintaining a temperature gradient across the membrane, the downstream side having the higher temperature.

7. A process according to claim 1, further comprising maintaining a pressure gradient across the membrane, the downstream side having the higher pressure.

8. A process according to claim 1 wherein the membrane has a textured surface.

9. Apparatus suitable for separating a gas into its components, said apparatus comprising a plurality of diffusion cells, each of said cells being subdivided into a gas feed chamber and a gas discharge chamber by a microporous sintered plastic membrane, with said chamber being provided with conduit means for effecting series communication between said cells, said conduit means comprising conduit for connecting the gas discharge chamber of each diffusion cell disposed upstream with the gas feed chamber of the subsequent diffusion cell, and further comprising cooler means and expansion valve disposed serially in association with said conduit.

10. Apparatus according to claim 9, said conduit means further comprising conduit between the gas feed chamber of each diffusion cell with the gas feed chamber of each diffusion cell arranged upstream thereof in the gaseous flowpath.

11. A process as defined by claim 1, said membrane having micropores of about 1 to 1,000 microns in diameter.

12. A process as defined by claim 1, said membrane having micropores of about 5 to 200 microns in diameter.

13. A process as defined by claim 1, said membrance consisting of polytetrafluoroethylene.

14. A process as defined by claim 11, said membrane consisting of polytetrafluoroethylene.

15. A process as defined by claim 1, said membrane comprising at least 50 percent by volume of polytetrafluoroethylene.

16. A process as defined by claim 1, said membrane comprising at least 70 percent by volume of polytetrafluoroethylene.

17. A process as defined by claim 1, said downstream side of said membrane being exposed to said vapor of a liquid which does not wet the downstream side.

18. A process as defined by claim 17, said membrane comprising at least 50 percent by volume of polytetrafluoroethylene and having micropores of a diameter of 1 to 1,000 microns.

19. A process as defined by claim 1, said upstream side of said membrane being dry.

20. A process as defined by claim 19, said membrane comprising at least 50 percent by volume of polytetrafluoroethylene and having micropores of a diameter of 1 to 1,000 microns.

* * * * *